ns of the coatings, a shield plate and a bottom plate

United States Patent [19]
Chiba et al.

[11] 4,353,937
[45] Oct. 12, 1982

[54] COATING METHOD

[75] Inventors: Katsuyoshi Chiba, Hachioji; Teruo Tsunoda, Nanpeidaimachi; Yoshiki Kato, Hinodemachi; Mitsushi Endo, Hadano; Fumihiko Sawase, Hakonemachi; Katuji Itikawa, Numazu; Masa-aki Imamura, Minami-ashigara, all of Japan

[73] Assignee: Hitachi, Ltd., Tokyo, Japan

[21] Appl. No.: 211,120

[22] Filed: Nov. 28, 1980

[30] Foreign Application Priority Data

Nov. 30, 1979 [JP] Japan .................................. 54-154379
Jul. 11, 1980 [JP] Japan .................................. 55-93922

[56] References Cited

U.S. PATENT DOCUMENTS 4,133,911 1/1979 Koester et al. .................... 427/128

Primary Examiner—Bernard D. Pianalto
Attorney, Agent, or Firm—Antonelli, Terry & Wands

[57] ABSTRACT

A method of coating a magnetic disk wherein while rotating a disk held horizontal at a rotational frequency of 5–700 r.p.m., a magnetic coating composition is sprayed onto the upper and lower surfaces of the disk substantially simultaneously, to form coatings thereon, and the disk is further rotated at a raised rotational frequency, to adjust the thicknesses of the coatings. Further, in case of the rotation for adjusting the thick-

COATING METHOD

BACKGROUND OF THE INVENTION

This invention relates to a method of, and an apparatus for producing magnetic disks.

A method of producing a magnetic disk has heretofore been practised, as disclosed in U.S. Pat. No. 3,198,657 etc., in such a way that while rotating a disk, a magnetic coating composition having magnetic powder dispersed therein is dropped onto a first side (the upper surface) of the disk, that the rotational frequency of the disk is subsequently raised to centrifugally shake off the excess coating material and to form a coating, and that the coating is dried and thermally cured into a magnetic layer. In order to form a magnetic layer on a second side (the lower surface) of the disk with this method, it is necessary to turn over the disk and repeat the same procedure after the magnetic layer has been formed on the first side as described above. If the magnetic coating composition is applied onto the second side before the coating of the first side is fully dried, the coating of the first side becomes thinner due to the rotation of the disk in that case and the magnetic layer of desired thickness cannot be obtained. Even after the drying of the coating on the first side, if the second side is coated before the curing, the coating of the first side is adversely affected because the ambient atmosphere is filled with the vapor of a solvent in the coating composition attributed to the evaporation of the solvent. As stated above, therefore, a coating needs to be formed on the second side after the coating of the first side has been cured. As a result, the coating of the first side undergoes heating for the curing twice. Radiant heat to be absorbed during the curing of the coating becomes unequal, depending upon whether one side of the disk is a bare metal surface coated with nothing or is already formed with the coating. Therefore, a very slight difference in performance develops between the magnetic layers of both the sides of the magnetic disk manufactured by the above method.

Such difference is almost negligible when the thickness of the magnetic layer is great. However, the thickness of a magnetic layer in a magnetic disk rendered high in the recording density needs to be made approximately 1–3 $\mu$m or less. In such case, the difference of the performances of both the sides poses various problems. Naturally, the job efficiency is inferior.

To the end of solving such problems or enhancing the job efficiency, it has been proposed and is disclosed in, for example, U.S. Pat. Nos. 3,730,760 and 4,033,288 that while holding a disk vertical or at an angle of 10°–30° with respect to the vertical plane, a coating material is applied onto both sides at the same time, whereupon it is dried and cured.

In forming coatings by the use of such method, there is involved the problem that when the excess coating material has been centrifugally shaken off, the coating material shaken off upwards falls onto the disk due to counter flow or counter dropping. To the end of preventing such splashing of the coating material, it has also been proposed that a casing for preventing the counter dropping is disposed near the outer edge of the disk so as to collect therein the coating composition shaken off.

However, the direction in which the coating material shaken off scatters varies to some extent due to complicated factors including the rotational frequency of the disk, the quantity of the excess coating material, the viscosity of the coating material, the temperature, etc. Even when, under the circumstances, one drop of splash strikes the inlet or some other place of the casing and then rebounds to fall onto the disk, the corresponding part of the disk becomes a defect. It is difficult to improve the structure of the casing so as to avoid such drawback in any case, and hence, the percentage of occurrence of non-conforming articles becomes high.

SUMMARY OF THE INVENTION

An object of this invention is to provide an improved method of, and apparatus for producing magnetic disks. Another object of this invention is to provide a method of, and apparatus for producing magnetic disks in which coatings are simultaneously formed on both the sides of a disk and which lower the percentage of occurrence of non-conforming articles.

In order to accomplish these objects, according to this invention, while a disk held horizontal is being rotated at a rotational frequency of 5–700 r.p.m., a coating composition is sprayed onto both the upper and lower surfaces of the disk substantially at the same time, to form coatings, and the rotation of the disk is further continued with the rotational frequency thereof kept intact or raised, to adjust the thicknesses of the coatings.

DETAILED DESCRIPTION OF THE PREFERRED EMBODIMENTS

One of the features of this invention consists in that the rotational frequency of a disk is made lower than in the prior arts. When the rotational frequency is high, the amount to which a coating composition sprayed from below is afforded onto the lower surface of the disk does not become equal to the amount to which the coating composition sprayed from above is afforded onto the upper surface. On the other hand, when the rotational frequency is too low, the coating composition is not distributed uniformly on the whole surfaces of the disk. Accordingly, the rotational frequency needs to be set at the range specified before, 5 to 700 r.p.m.

Figure 1:
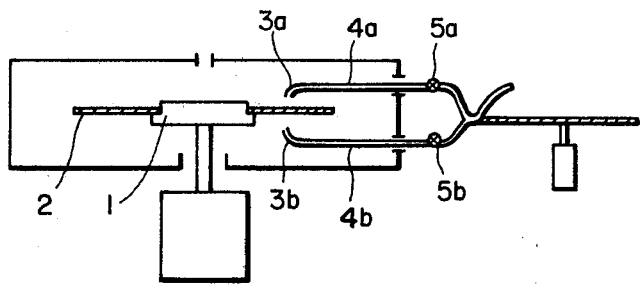
FIGS. 1 and 2 are a sectional front view and a plan view of an embodiment of a coating apparatus according to this invention, respectively.
Figure 2:
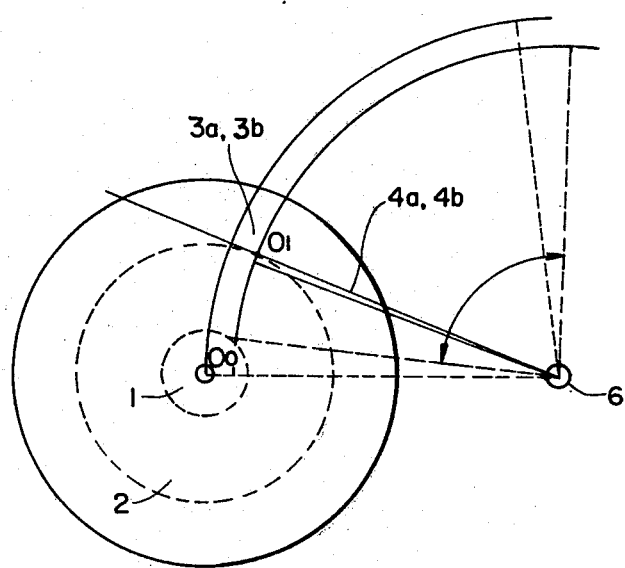

Hereunder, this invention will be described with reference to the drawings. FIG. 1 is a sectional front view of an embodiment of a coating apparatus according to this invention, while FIG. 2 is a plan view thereof. A disk 2 (aluminum plate having an inside diameter of 170 mm, an outside diameter of 356 mm and a thickness of 2 mm) is secured to a rotatable support 1. Supply pipes 4a and 4b having nozzles 3a and 3b which spout a coating composition at an angle of 60–90 degrees with respect to the horizontal plane move along a semicircle in the horizontal direction. The positions of the nozzles 3a and 3b are not set over and under the center of rotation $0_0$ of the support 1, but they are respectively set over and under a point $0_1$ at which a tangential line drawn from the center of rotation 6 of the supply pipes 4a and 4b to the outer periphery of the disk 2 lies in contact with the outer periphery. Shown at 5a and 5b are adjusting valves.

The lower supply pipe 4b has its front end declined towards the nozzle 3b, and has a gradient of approximately 10 degrees. Thus, even when the excess coating composition falls on the supply pipe, it flows downwardly without causing any inconvenience. In a place corresponding to the lowermost point of the supply pipe 4b, in other words, under the nozzle 3b, a protuberance (not shown) is disposed in a manner to extend downwards. The coating material having fallen on the supply pipe drops readily along the protuberance.

Figure 3:
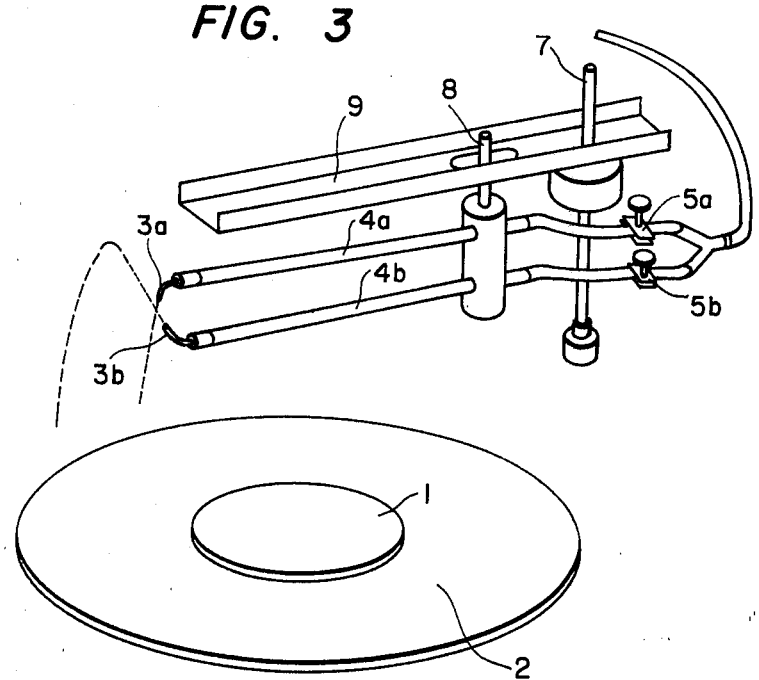
FIG. 3 is a schematic perspective view for explaining another embodiment.

FIG. 3 is a schematic explanatory view of another embodiment of the coating machine according to this invention. The nozzles 3a and 3b are regulated so that their spouting angles for the coating composition may become 45 degrees frontwards (or inclined rightwards or leftwards). When the senses of the nozzles are set at such angles, the spouted coating composition does not strike the disk 2 to fall on the lower nozzle 3b, and hence, the downward protuberance need not always be disposed at the lowermost point of the supply pipe 4b. Numeral 7 indicates a driving shaft, numeral 8 a supporting jig, and numeral 9 a support driving jig.

The supply pipes 4a and 4b having the nozzles may well move frontwards and rearwards in the axial directions thereof over and under the disk respectively, not in the semicircular directions.

In these apparatuses, the nozzles 3a and 3b are installed with their angles set so that the coating composition may be spouted at an angle of 45-90 degrees, preferably 60-80 degrees with respect to the disk substrate.

It is desirable that the bore of the nozzle is made approximately equal to or smaller than the bore of the supply pipe so as to spout or drop the coating composition or bring it into contact with the disk. The bore of the nozzle and a pressure for spouting the coating composition are regulated so that the coating material spouted from the lower nozzle 3b may issue out from the port of the nozzle up to a height which is 1.2-65 times, preferably 6-30 times the bore of the supply pipe. When the spouting pressure is too high, the amount of splashes appearing in such a manner that the spouted coating composition strikes the disk and then rebounds increases. Conversely, when the spouting pressure is too low, the spouted coating composition does not rise very high from the port of the nozzle. Therefore, it becomes necessary to bring the nozzle into close proximity to the disk. In that case, air current under the rotating disk is adversely affected, and local non-uniformity arises in the vaporization of a solvent in the coating composition, resulting in an inferior quality of the surface of the coating. It is accordingly preferable that the height of the spouted coating composition becomes as specified above.

The formation of the coatings is carried out as stated above. First, the disk 2 is fixed to the support 1, and preferably both the sides of the disk are cleansed with a solvent. In cleaning the disk, one set of pipes which are substantially the same as the supply pipes for applying the coating composition are separately disposed, they are arranged at positions at which they do not interfere with the movements of the supply pipes for applying the coating material, they are used to spray the solvent onto both the sides of the disk, and the disk is rotated to shake off the solvent. If necessary, the rotation is further continued until the solvent remaining on the disk vaporizes. Subsequently, the coating material is spouted from the nozzles and is simultaneously sprayed onto both the sides of the disk while rotating the disk at a rotational frequency of 5-700 r.p.m., preferably 30-300 r.p.m. and more preferably 30-150 r.p.m. (primary rotation) and moving the supply pipes horizontally and semicircularly once or twice or more times over and under the disk. The coating composition is spread over substantially the whole surfaces of the disk by the rotation, and the excess coating material is shaken off from on the disk by centrifugal forces based on the rotation. At the next step, in order to render the thicknesses of the coatings a predetermined value, the disk is rotated with its rotational frequency raised to 200-3,000 r.p.m. (secondary rotation), to further shake off the excess coating composition from on the disk. The rotational frequency of the primary rotation and that of the secondary rotation may well be equal to each other. Even if the coating composition is not spread on a part or parts of the disk in the primary rotation, it is satisfactorily distributed over the entire surfaces in the secondary rotation.

Magnetic coating compositions with magnetic powder dispersed therein have been known from the specifications of the patents previously mentioned and other literatures, and these known coating compositions are employed. For example, the magnetic coating composition is prepared in such a way that a binder made of an epoxy resin, a phenol resin, or polyvinyl butyral is dissolved in an organic solvent, that the magnetic powder is dispersed in the resulting solution, and that if necessary, a reinforcing agent such as alumina is further dispersed. Other polymers to be used as the binders are a polyester resin, a vinyl chloride resin, polyurethane or a polyurethane forming agent, an acrylate copolymer, a methacrylate copolymer etc., or mixtures thereof.

If necessary, in order to adjust the magnetic coating composition to a desired viscosity, it is further thinned with an organic solvent, for example, tetrahydrofuran, toluene, methyl ethyl ketone, cyclohexanone or dioxan, or any of mixtures thereof. A preferable viscosity is approximately 50-480 cps. (at 20° C.), and a more preferable viscosity is 100-350 cps. (do.).

After the coatings have been formed on both the sides of the disk, a magnetic field orientation is carried out if necessary. The magnetic field orientation may be performed in the position where the disk is mounted on the support, or may well be performed in another position to which the disk has been moved.

Further, the disk is dried and thermally cured as usual. The drying and/or the thermal curing can also be performed during the magnetic field orientation.

A practical embodiment of this invention will now be described. An aluminum disk having an outside diameter of 356 mm is horizontally fixed to a support, nozzle tips (nozzles each having a bore of 0.5 mm$\phi$) coupled to supply pipes (each having a bore of 4 mm$\phi$) are located at positions spaced 5 mm from both the sides of the disk, and the sense of each nozzle is set at an angle of 45 degrees with respect to the horizontal plane. While rotating the disk at a rotational frequency of 100 r.p.m., a coating composition having a viscosity of 137 cps. is sprayed onto both the sides simultaneously, and the rotational frequency is thereafter raised to 1,500 r.p.m., whereby coatings are formed. Further, the coatings are dried and thermally cured as in the conventional fashion.

Further, this invention provides a more improved coating method and coating apparatus as described below. Regarding the magnetic disks produced by the methods of the foregoing embodiments, slight differences are still noted in the electrical characteristics of both the sides. The reason therefor will be as follows. When the coating composition has been sprayed from the supply pipes onto both the sides of the disk and the excess coating composition has been shaken off by the rotation of the disk, the coating material shaken off strikes a collector encircling the disk and then falls to accumulate on a bottom plate. The coating composition (coating) stuck on the lower surface of the disk touches the vapor of a solvent appearing from the coating composition having accumulated on the bottom plate, so that the solvent is difficult to vaporize from the coating composition (applied coating). In contrast, the coating composition (coating) stuck on the upper surface of the disk touches the air containing no solvent, so that the solvent in this coating is easy of vaporization. Therefore, the viscosity of the coating composition (applied coating) rises. When the disk is rotated at the high speed to adjust the thicknesses of the coatings, the coating formed on the upper surface becomes thicker than that formed on the lower surface on account of the difference of the viscosities. Such unequal thicknesses of the coatings on both the sides result in the different electrical characteristics.

The difference of the coatings on both the sides appears more conspicuously in the inner peripheral part than in the outer peripheral part of the disk. The reason therefor is conjectured to be that the air in the vicinities of the surfaces of the disk rotates with the rotation of the disk in a similar manner during the high-speed rotation, air currents being advanced from the center towards the outer periphery of the disk by the resulting centrifugal forces, so that even over the disk, the air lying in contact with the outer peripheral part contains some extent of vapor of the solvent having appeared in the inner peripheral part.

In case of coatings whose thicknesses in the inner periphery are 1 $\mu$m or so, the difference of the thicknesses of the coatings on both the sides becomes as great as 50% or more.

The present invention has solved this problem by executing the disk rotation for adjusting the thicknesses of the coatings in such a way that a shield plate is arranged over at least that part of the disk on which the coating is formed, while a bottom plate is arranged under the disk, and under the state under which a distance ($V_2$) from the shield plate to the disk is made shorter than a distance ($V_1$) from the bottom plate to the disk.

More preferably, the ratio ($V_1/V_2$) between both the distances lies within a range of 1.1–4.0, and most preferably, it lies within a range of 1.2–2.6. This is because the difference of the thicknesses of the coatings on both the sides decreases in the range of 1.1–4.0, and it decreases most in the range of 1.2–2.6.

Figure 4:
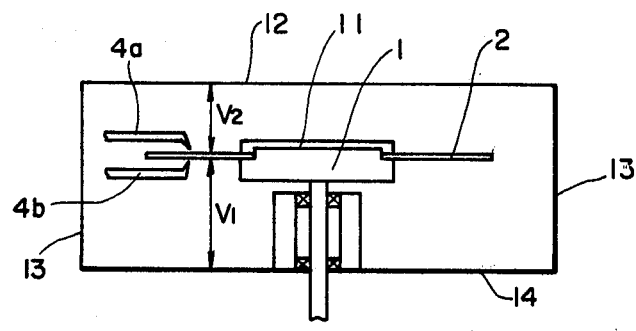
FIGS. 4, 5, 6 and 7 are sectional front views each showing another embodiment.

FIG. 4 is a sectional front view of an embodiment of such coating apparatus. A disk 2 (aluminum disk having an inside diameter of 170 mm, an outside diameter of 356 mm and a thickness of 2 mm) is fixed to a rotatable support 1. The fixation is effected by, for example, clamping a cover 11 with screws. A coating composition is sprayed from the front ends of supply pipes 4a and 4b onto the disk 2. Numeral 12 designates a shield plate, numeral 13 a collector plate, and numeral 14 a bottom plate. In the illustrated manner, the shield plate may well serve also as a cover for the apparatus.

Figure 5:
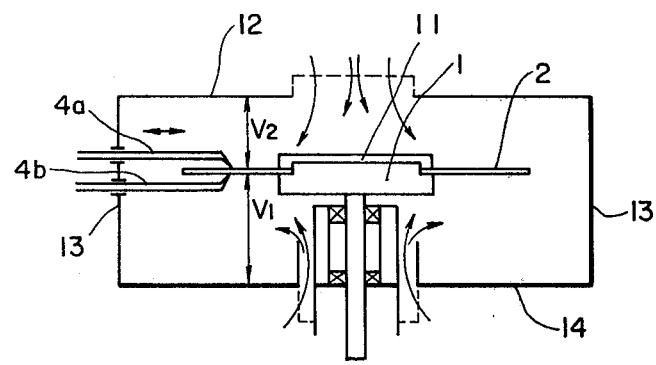

FIG. 5 is a sectional view of another embodiment. Holes are provided in or near the central parts of the shield plate 12 and the bottom plate 14 so as to permit the air to enter the apparatus externally. In this case, both the holes need to be of sizes at which approximately equal amounts of the air can enter. The air may well be one which contains the vapor of a solvent of the same type as that of the solvent of the coating composition. In this case, the gaseous mixture consisting of the vapor of such solvent and the air may be fed into the two holes through pipes. In this manner, both the shield plate and the bottom plate may exist over and under at least those areas of the disk on which the coating material is to be applied.

As still another improved coating method and coating apparatus, the following is proposed.

After the magnetic coating composition has been applied onto both the sides of the disk substantially simultaneously, the rotation of the disk for adjusting the thicknesses of the coatings is executed with shield plates arranged over and under at least those parts of the disk on which the coatings have been formed, respectively.

Figure 6:
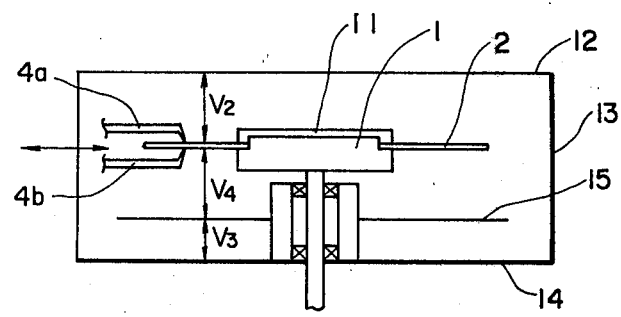

FIG. 6 is a sectional front view of an embodiment of such coating apparatus. A lower shield plate 15 is disposed under the disk 2. Thus, the vapor of the solvent having appeared from the coating composition existent on the bottom plate 14 is prevented from influencing the disk 2. The distance between the bottom plate 14 and the lower shield plate 15 is set at $V_3$.

A distance ($V_2$ in FIG. 6) from the disk 2 to the upper shield plate 12 and a distance ($V_4$ in FIG. 6) to the lower shield plate 15 need not be quite equal, but they may well differ within a certain extent of range. Regarding this range, a range of 0.25–6.0 in terms of the ratio ($V_4/V_2$) between both the distances $V_4$ and $V_2$ is preferable, a range of 0.5–4.0 is more preferable, and a range of 1.0–2.6 is the most preferable. Since a space underlying the disk and a space overlying the bottom plate are not perfectly separated, the vapor of the solvent having developed from the coating composition on the bottom plate enters also the space underlying the disk more or less. Therefore, the favorable values of the ratio $V_4/V_2$ do not center on 1.0 but spread towards greater values.

In this manner, the disk rotation for adjusting the thicknesses of the coatings (the secondary rotation) is performed by disposing the shield plates over and under the disk, whereby the problem previously described can be solved. It is preferable that the shield plates are disposed also during the disk rotation for applying the coating material (the primary rotation). In this case, however, the shield plates may well be dispensed with.

In the application, the coating composition applied onto the lower surface of the disk should preferably be prevented from falling onto the lower shield plate. To this end, the coating operation needs to be performed while rotating (as the primary rotation) the disk at a rotational frequency of 5–700 r.p.m., preferably 30–300 r.p.m., and more preferably 30–150 r.p.m. Since the stuck coating composition flows towards the outer periphery on the disk owing to centrifugal forces based on the rotation of the disk, the coating material is prevented from accumulating in one place and then falling. To rotate the disk too fast is unfavorable because the coating composition sprayed on the lower surface splashes.

When the quantity of spout of the coating composition from the supply pipes is too large, the coating material falls onto the lower shield plate. The spouting pressure should preferably be regulated so that the excess coating material may be centrifugally shaken off towards the outer periphery to reach the collector plate, but that it may be prevented from falling onto the lower shield plate.

Figure 7:
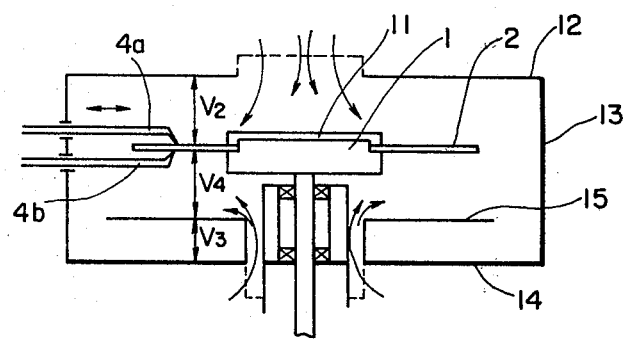

FIG. 7 is a sectional view of another embodiment of this invention. Holes through which approximately equal amounts of air can enter the apparatus from outside are provided in or near the central parts of the upper and lower shield plates and the bottom plates. The air to be externally introduced may well contain the vapor of a solvent of the same type as that of the solvent of the coating material. In this manner, the upper and lower shield plates may extend over and under at least those parts of the disk on which the coating composition is to be applied.

Hereunder, examples will be explained.

EXAMPLES 1–9

By setting the distance $V_1$ in the coating apparatus of FIG. 4 at 130 mm and varying the height of the shield plate 12, the ratios of $V_1/V_2$ were determined as in Table 1 below. The nozzles of the supply pipes were inclined in the rotating direction at angles of 75 degrees with respect to the horizontal planes. The disk was cleansed with the solvent as stated previously. Thereafter, while rotating the disk at 100 r.p.m., the coating composition (at 250 cps.) was spouted at a rate of 50 c.c./min. per supply pipe and was applied onto the disk. The supply pipes were semicircularly moved from the outer periphery towards the inner periphery and then towards the outer periphery in about 25–30 seconds. Thereafter, the disk was rotated at 1,200 r.p.m. for 20 seconds so as to make the thicknesses of the coatings approximately 1 μm in the inner periphery (thicknesses of the coatings after the curing). The differences of the thicknesses of the coatings on both the sides in the inner periphery after the drying and curing were as listed in the table. Favorable results were obtained in a range of 1.1–4.0 in terms of the ratio of $V_1/V_2$, and more favorable results were obtained in a range of 1.2–2.6.

The spacing from the outer peripheral end of the disk 2 to the collector plate 13 is recommended to be made at least 30 mm, more preferably at least 50 mm. Otherwise, the coating composition having struck the collector plate splashes to return onto the disk, with the result that the surfaces of the coatings become non-uniform.

TABLE 1

| No. | $V_1/V_2$ ratio | Difference of thicknesses of coatings in μm |
| --- | --- | --- |
| 1 | 0.50 | 0.50 |
| 2 | 1.00 | 0.35 |
| 3 | 1.10 | 0.27 |
| 4 | 1.18 | 0.22 |
| 5 | 1.53 | 0.15 |
| 6 | 2.00 | 0.12 |
| 7 | 2.60 | 0.20 |
| 8 | 3.95 | 0.25 |
| 9 | 4.33 | 0.31 |

Regarding the table, the expression "inner periphery" corresponds to a position of a radius of 100 mm. Even when the difference of the thicknesses of the coatings is 0.15 μm in the inner periphery, it is 0.08 μm in an intermediate position (135 mm in radius) and 0.06 μm in the outer periphery (170 mm in radius).

The thicknesses of the coatings were measured by the use of commercially-available X-ray film thickness gauge "SST-155" (sold by Daini Seikosha in Japan).

EXAMPLES 10–17

In these examples, the coating apparatus of FIG. 6 was used. The ratios of $V_4/V_2$ were set as indicated in Table 2 by varying the heights of the shield plates, and the following experiment was conducted for each ratio. The distance $V_3$ was held constant.

The nozzles of the supply pipes were inclined at angles of 75 degrees with respect to the horizontal planes so that the coating composition might spout substantially in the rotating direction. The coating composition employed consisted of 700 parts by weight of magnetic powder, 70 parts by weight of polyvinyl butyral, 120 parts by weight of a phenol resin, 120 parts by weight of an epoxy resin, and a mixed solvent including cyclohexanone, isophorone and dioxan, and it had a viscosity of 250 cps.

While rotating the disk at 100 r.p.m. and while spouting the coating composition from the supply pipes at a rate of 50 c.c./min. per supply pipe, both the sides of the disk were coated. Thereafter, the disk was rotated at 1,200 r.p.m. for 20 seconds so as to make the thicknesses of the coatings approximately 1 μm in the inner periphery (thicknesses of the coatings after the curing). The differences of the thicknesses of the coatings on both the sides in the inner periphery after the drying and curing were as listed in Table 2. The expression "inner periphery" signifies a position of a radius of 100 mm, and the differences of the thicknesses of the coatings are great in the inner periphery as described before. For example, even in a sample in which the difference of the thicknesses of the coatings in the inner periphery is 0.15 μm, the difference in the outer periphery (corresponding to a position of a radius of 170 mm) is 0.06 μm. It is added that the difference of the thicknesses of the coatings became 0.5 μm or greater in the absence of the shield plates.

TABLE 2

| No. | $V_4/V_2$ ratio | Difference of thicknesses of coatings (μm) |
| --- | --- | --- |
| 10 | 0.25 | 0.34 |
| 11 | 0.5 | 0.25 |
| 12 | 1.0 | 0.15 |
| 13 | 1.2 | 0.12 |
| 14 | 2.0 | 0.12 |
| 15 | 2.6 | 0.15 |
| 16 | 4.0 | 0.26 |
| 17 | 6.0 | 0.37 |

EXAMPLES 18–25

Using the coating apparatus of FIG. 7, the same experiments as in Examples 10–17 were conducted. The results were as listed in Table 3.

TABLE 3

| No. | $V_4/V_2$ ratio | Difference of thicknesses of coatings (μm) |
| --- | --- | --- |
| 18 | 0.25 | 0.25 |
| 19 | 0.5 | 0.15 |
| 20 | 1.0 | 0.03 |
| 21 | 1.2 | 0.02 |
| 22 | 2.0 | 0.02 |
| 23 | 2.6 | 0.04 |
| 24 | 4.0 | 0.18 |

TABLE 3-continued

| No. | $V_4/V_2$ ratio | Difference of thicknesses of coatings (μm) |
|---|---|---|
| 25 | 6.0 | 0.27 |

What is claimed is:

1. A method of forming magnetic coatings comprising the step of spraying a magnetic coating composition with magnetic powder dispersed therein onto both sides of a horizontally arranged disk substantially simultaneously while the disk is being rotated at a speed of 5 to 700 r.p.m. to distribute said coating composition over whole surfaces of said disk due to the rotation of said disk and to centrifugally throw off excess coating composition, and the step of further rotating said disk at a rotational frequency which is not lower than said speed to adjust thicknesses of the coatings; the rotation of said disk for adjusting thicknesses of the coatings being executed under a state wherein a shield plate is arranged over at least that part of said disk formed with said coating and a bottom plate is arranged under at least that part of said disk formed with said coating, and wherein a distance from the shield plate to the disk is less than a distance from the bottom plate to the disk.

2. A coating method as defined in claim 1, wherein the rotational frequency of the rotation of said disk for adjusting thicknesses of the coatings is 200 to 3,000 r.p.m.

3. A coating method as defined in claim 1 or 2, wherein said magnetic coating composition is a coating composition having a viscosity that is 50 to 350 cps.

4. A coating method as defined in claim 1 or 2, wherein the spraying of said coating composition is executed at an angle of 90 degrees to 45 degrees with respect to said disk.

5. A coating method as defined in claim 1, wherein the speed of rotation of said disk during the step of spraying the coating composition is 30 to 300 r.p.m.

6. A coating method as defined in claim 1, wherein the rotation of said disk for adjusting thicknesses of said coatings is executed under a state wherein the distance from said bottom plate to said disk falls within a range of 1.1 to 4.0 times the distance from said shield plate to said disk.

7. A coating method as defined in claim 1, wherein the rotation of said disk for adjusting thicknesses of said coatings is executed under a state wherein the distance from said bottom plate to said disk falls within a range of 1.2 to 2.6 times the distance from said shield plate to said disk.

8. A coating method as defined in claim 6 or 7, wherein the rotational frequency of the rotation of said disk for adjusting thicknesses of said coatings is 200 to 3,000 r.p.m.

9. A coating method as defined in claim 6 or 7, wherein the rotation of said disk for adjusting thicknesses of said coatings is executed while approximately equal amounts of air are kept flowing in from, or from near, central parts of said shield plate and said bottom plate.

10. A coating method as defined in claim 6 or 7, wherein the rotation of said disk for adjusting thicknesses of said coatings is executed while approximately equal amounts of air containing a vapor of a solvent of the same type as that of a solvent of said magnetic coating composition are kept flowing in from, or from near, central parts of said shield plate and said bottom plate.

11. A coating method as defined in claim 1, wherein the shield plate and the bottom plate are held stationary.

12. A method of forming magnetic coatings comprising the step of spraying a magnetic coating composition with magnetic powder dispersed therein onto both sides of a horizontally arranged disk substantially simultaneously while the disk is being rotated at a speed of 5 to 700 r.p.m. to distribute said coating composition over whole surfaces of said disk due to the rotation of said disk and to centrifugally throw off excess coating composition and the step of further rotating said disk at a rotational frequency which is not lower than said speed to adjust thicknesses of the coating; the rotation of said disk for adjusting thicknesses of the coatings being executed under a state wherein shield plates are, respectively, arranged over and under at least those parts of said disk provided with said coatings and the distance from the disk to the shield plate arranged over said disk being less than the distance from the disk to the shield plate arranged under said disk.

13. A coating method as defined in claim 12, wherein the rotation of said disk for adjusting thicknesses of said coatings is executed while the distance from said disk to the lower shield plate is held in a range of 0.25 to 6.0 times the distance from said disk to the upper shield plate.

14. A coating method as defined in claim 12, wherein the rotation of said disk for adjusting said thicknesses of said coatings is executed while the distance from said disk to the lower shield plate is held in a range of 0.5 to 4.0 times the distance from said disk to the upper shield plate.

15. A coating method as defined in any of claims 12, 13 and 14, wherein the rotational frequency of the rotation of said disk for adjusting thicknesses of said coatings is 200 to 3,000 r.p.m.

16. A coating method as defined in any of claims 12, 13 and 14, wherein the rotation of said disk for adjusting thicknesses of said coatings is executed while approximately equal amounts of air are kept flowing in from, or from near, central parts of the upper and lower shield plates.

17. A coating method as defined in any of claims 12, 13 and 14, wherein the rotation of said disk for adjusting thicknesses of said coatings is executed while approximately equal amounts of air containing a vapor of a solvent of the same type as that of a solvent of said magnetic coating composition are kept flowing in from, or from near, central parts of the upper and lower shield plates.

18. A coating method as defined in claim 12, wherein said shield plates are held stationary.

* * * * *